(12) United States Patent
Hamann et al.

(10) Patent No.: US 7,698,114 B2
(45) Date of Patent: Apr. 13, 2010

(54) TECHNIQUES FOR DISTRIBUTING POWER IN ELECTRONIC CIRCUITS AND COMPUTER SYSTEMS

(75) Inventors: Hendrik F. Hamann, Yorktown Heights, NY (US); James A. Lacey, Mahopac, NY (US); Jamil Wakil, Buchanan Dam, TX (US); Alan J. Weger, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 11/264,968

(22) Filed: Nov. 2, 2005

(65) Prior Publication Data

US 2007/0098037 A1 May 3, 2007

(51) Int. Cl.
*G06G 7/56* (2006.01)
*G06G 7/50* (2006.01)
*G01J 5/00* (2006.01)
*G01K 3/04* (2006.01)
*G01K 3/06* (2006.01)
*G01K 17/00* (2006.01)

(52) U.S. Cl. ............... 703/5; 703/9; 374/130; 374/137; 702/130; 702/136

(58) Field of Classification Search .......... 374/137, 374/130; 703/5, 9; 702/130, 136
See application file for complete search history.

(56) References Cited

U.S. PATENT DOCUMENTS

| | | | |
|---|---|---|---|
| 5,550,750 A * | 8/1996 | Wolff | 716/10 |
| 7,092,855 B2 * | 8/2006 | Wyatt et al. | 703/1 |
| 7,167,806 B2 * | 1/2007 | Hamann et al. | 702/136 |
| 7,216,660 B2 * | 5/2007 | Troian et al. | 137/13 |
| 7,347,621 B2 * | 3/2008 | Sri-Jayantha et al. | 374/166 |
| 7,596,464 B2 * | 9/2009 | Hermerding et al. | 702/99 |
| 2004/0083075 A1 * | 4/2004 | Fan | 702/129 |
| 2005/0094706 A1 | 5/2005 | Guha et al. | 374/137 |
| 2005/0114068 A1 | 5/2005 | Chey et al. | 702/130 |
| 2005/0228618 A1 * | 10/2005 | Patel et al. | 702/188 |
| 2006/0039114 A1 * | 2/2006 | Hamann et al. | 361/704 |

(Continued)

OTHER PUBLICATIONS

IEEE 2000 article "Cell-Level Placement for Improving Substrate Thermal Distribution" p. 253-266 by Ching-Han Tsai et al.*

(Continued)

*Primary Examiner*—Kamini S Shah
*Assistant Examiner*—Akash Saxena
(74) *Attorney, Agent, or Firm*—Ryan, Mason & Lewis, LLP (57) ABSTRACT

Techniques for enhancing thermal design of a system having a number of boundary values are provided. A method for such enhancement includes representing thermal response of the system to the boundary values, obtaining at least one constraining parameter, and determining spatial and/or temporal distribution of the boundary values. The thermal response is represented as a superposition of temperature fields associated with given boundary values. The spatial and/or temporal distribution of the boundary values is determined based on the thermal response represented in the representing step, so as to satisfy the constraining parameter. The boundary values can be, for example, power sources, and the at least one constraining parameter can be, for example, a spatial or temporal location of one of the power sources.

15 Claims, 8 Drawing Sheets

U.S. PATENT DOCUMENTS

| | | | |
|---|---|---|---|
| 2006/0047808 A1* | 3/2006 | Sharma et al. | 709/224 |
| 2006/0064999 A1* | 3/2006 | Hermerding et al. | 62/259.2 |
| 2007/0005152 A1* | 1/2007 | Karr et al. | 700/22 |
| 2009/0024347 A1* | 1/2009 | Chandra et al. | 702/130 |

OTHER PUBLICATIONS

IBM J. Res. & Dev. vol. 49 No. 4/5 Jul./Sep. 2005 article "Challenges of data center thermal management" by R. R. Schmidt et al p. 709-723.*

"Using FLOTHERM and the Command Center to Exploit the Principle of Superposition" by Paul Gauché (Gauché hereafter) p. 1-7, Presented in 2000-2001 during Mentor Graphics 9th International FloTHERM User Conference in Orlando USA.*

"Thermal stress analysis of a multichip package design" by R. Darveaux et al in IEEE Dec. 1989 pp. 663-672.*

"Thermal Analysis and Validation of MCMs", Pollard, L.L., Salskov, E., and Lee, S., 16th Annual IEEE Semiconductor Thermal Measurement and Management Symposium (SEMI-THERM), pp. 140-146, San Jose, CA, Mar. 21-23, 2000.*

IEEE 2003 Article presented in 19th IEEE SEMI-THERM Symposium, "Recent Progress in Compact Thermal Models" by Clemens J.M. Lasance, pp. 290-300, 2003.*

"ANSYS Multiphysics Solution," www.ansys.com/assets/brochures/multiphysics-solution-10.pdf (downloaded Jul. 25, 2006).

"Products Overview," www.sinda.com/prod_overview.htm (downloaded Jul. 24, 2006).

"New Package Thermal Designer 2.0 from Harvard Thermal Enables Quick Thermal Characterization of Complex ICs," www.harvardthermal.com/PTDEncore.htm (downloaded Jul.25, 2006).

Sheaffer et al., "Studying Thermal Management for Graphics-Processor Architectures," 0-7803-8965-4/05, IEEE (2005).

"Thermally Aware Design Methodology," Gradient Design Automation, Inc. (Sep. 22, 2005).

Etessam-Yazdani et al., "Impact of power granularity for chip thermal modeling," Proceedings from the $9^{th}$ ITherm, San Diego, CA (May 2006).

* cited by examiner

TECHNIQUES FOR DISTRIBUTING POWER IN ELECTRONIC CIRCUITS AND COMPUTER SYSTEMS

FIELD OF THE INVENTION

The present invention generally relates to computer-aided analysis and design techniques, and, more particularly, to computer-aided analysis and design techniques pertinent to thermal design of electronic circuits, computer systems, and the like.

BACKGROUND OF THE INVENTION

The performance of electronic circuits, such as microprocessors, and that of computer systems has continued to increase. Such increasing performance has most often been obtained by aggressive scaling of individual devices, in turn allowing an increase in device density on the silicon circuitry. Additional functionality, cores and memory have also been added to typical circuits. This trend has resulted in a large increase in power dissipation for microprocessors and computer systems.

As a result of the trend towards increased power, there has been an effort to reduce the power consumption of microprocessors and computer systems. Accordingly, a good deal of attention has recently been directed towards so-called power-aware or power-limited designs. In such designs, the goal is to reduce the overall power dissipation of the microprocessor or computer system. The power-aware design is perhaps best suited for computer systems that are limited by power delivery. An example is a lap-top computer limited by its battery lifetime, or a microprocessor limited by current carrying capacity in the packaging.

Given the importance of thermal design to current electronic circuits and computer systems, it may be desirable to seek improved techniques for thermal analysis and design of such systems.

SUMMARY OF THE INVENTION

Principles of the present invention provide techniques for thermal analysis and design of thermal systems, such as electronic circuits and computer systems. In one aspect, an exemplary method for enhancing thermal design of a system with a plurality of boundary values can include steps of representing thermal response of the system to the plurality of boundary values, obtaining at least one constraining parameter, and determining at least one of spatial and temporal distribution of the boundary values. The method can be computer-implemented.

In the representing step, the representation of the thermal response can be in the form of a superposition of temperature fields associated with given ones of the boundary values. Further, in the determining step, the determining can be done based on the thermal response represented in the representing step, in order to satisfy the at least one constraining parameter. The representing can be performed via predictive thermal modeling with a thermal model of the system.

The boundary values can include, for example, power sources or fixed temperature regions. The constraining parameters can refer, e.g., to spatial locations, time slots, or magnitudes or ranges pertinent to the boundary values.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
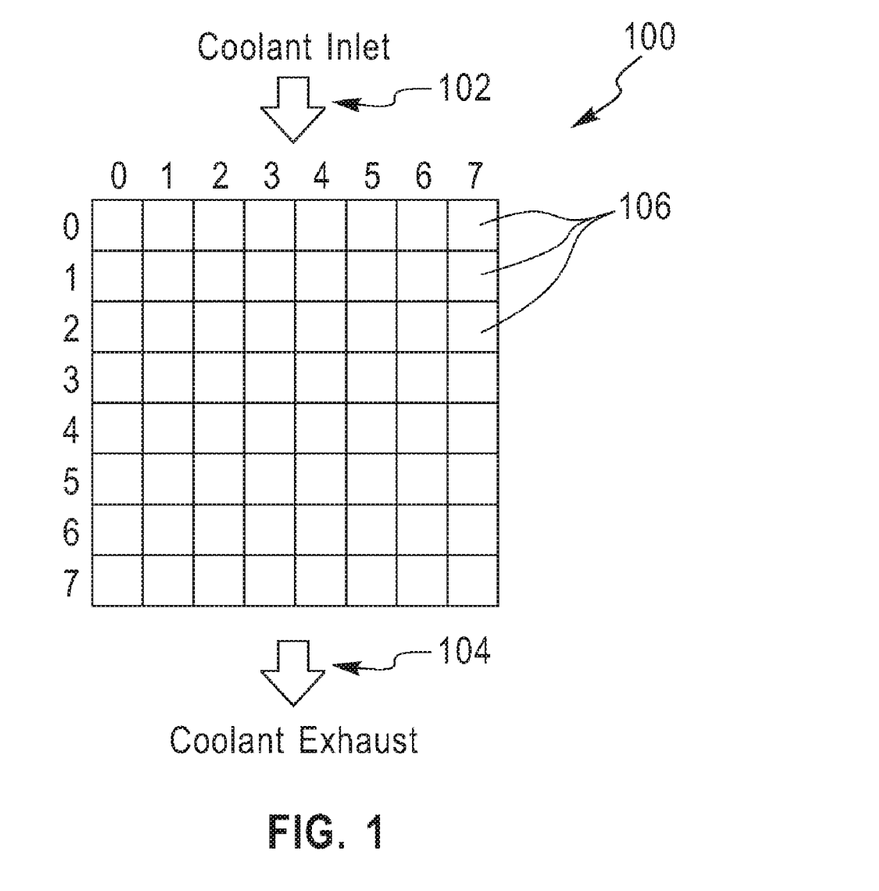
FIG. 1 is a schematic diagram of a system undergoing thermal design in accordance with techniques of the present invention.

FIG. 1 shows a schematic diagram of a system 100 to which techniques of the present invention can be applied. System 100 can be representative, for example, of an integrated circuit chip, a computer system, or a data center. In the case of an integrated circuit chip, the system can be, for example, convectively cooled using a fluid coolant which is inlet at location 102 near the top of system 100 and exhausted at location 104 near the bottom of system 100. The configuration depicted is exemplary in nature, and techniques of the present invention can be applied to systems using different types of cooling, for example, free convection, forced convection (with different types of flow arrangements), radiation, conduction, and other known techniques. System 100 can be discretized into a number of smaller cells 106, such as elements (in the case of finite element analysis, e.g.) or nodes (in the case of finite difference analysis, e.g.). The fineness of this discretization is referred to as the granularity. The exemplary system 100 is divided into sixty four cells designated as $a_{00}$ through $a_{77}$ (corresponding to the marginal numbers 0 through 7 for the rows and columns, respectively).

The system 100 can have a number of boundary values. Such boundary values can include, for example, power sources (such as cores on an integrated circuit chip) or fixed temperature regions. Such regions can include single points, areas, and other types of spatial regions. Further, "fixed" implies known but not necessarily constant temperature values for such regions. Other types of boundary values, for example, associated with the different kinds of cooling mentioned above, are also possible.

In one aspect of the invention, wherein at least some of the boundary values are power sources, techniques of the invention can be used to determine where the power sources should best be located within system 100, or when the power sources should be applied, that is, in a transient system, what times are preferable for application of certain power sources (for example, to obtain desired temperature distributions). In this manner, considering where and when the power should be located, as opposed to simply trying to reduce the overall power level, significant enhancement in thermal performance of the system (e.g., removal or minimization of hot spots) can be obtained.

Figure 2:
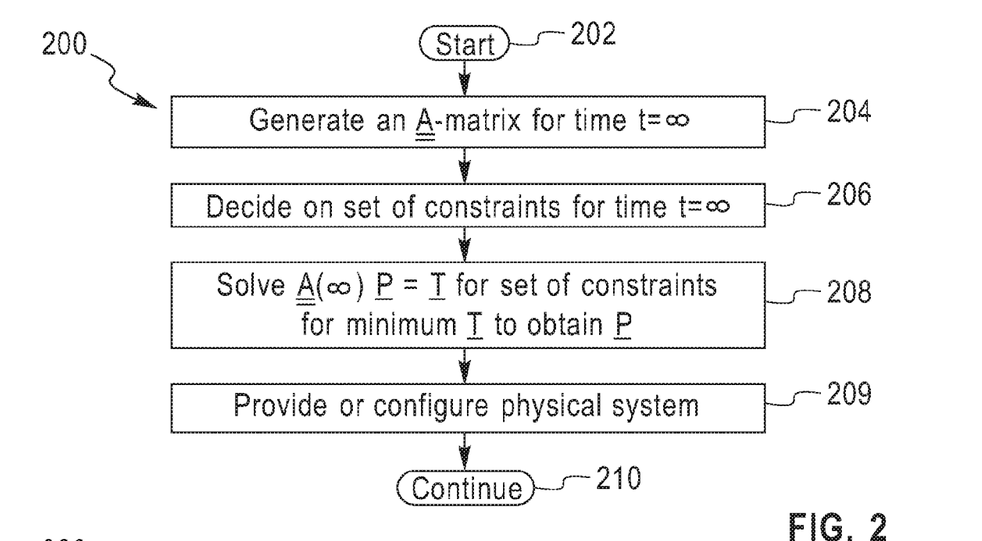
FIG. 2 is a flow chart depicting exemplary method steps for enhancing thermal design of a system according to an aspect of the present invention.

Attention should now be given to FIG. 2, which shows a flow chart 200 of exemplary method steps of one possible method for enhancing thermal design of a system, such as system 100, using techniques of the present invention. As used herein, "enhancement" of a design includes: optimization, improvement (other than optimization) compared to designs not using techniques of the present invention, and/or modification based on performance of design trade-offs taking into account various design goals or considerations. One typical overall goal is the removal or minimization of hot spots, or in the case of a data center, the prevention of localized overcooling and/or overheating. After beginning at block 202, at block 204, the thermal response of the system to the plurality of boundary values can be represented as a superposition of temperature fields associated with given ones of the boundary values. In the example shown in FIG. 2, the representation is in the form of a matrix A generated for steady-state conditions (t=∞). Further detailed discussion of the A matrix will be presented below. As indicated at block 206, at least one constraining parameter can be obtained. Such constraining parameter typically constrains one or more of the boundary values; for example, a spatial location, a temporal slot, and/or a magnitude specification (which could be in the form of a range). In the exemplary flow chart shown in FIG. 200, a set of constraints are obtained for steady-state conditions.

At block 208, spatial and/or temporal distribution of the boundary values can be determined, based on the thermal response represented in step 204, to satisfy the one or more constraining parameters obtained at step 206, so as to obtain a desired (e.g., optimized or otherwise enhanced) temperature distribution T. In the example shown in FIG. 2, the determining is performed by solving the indicated equation to minimize the temperature vector T so as to obtain a corresponding distribution of the power sources in the form of the vector P. Note that minimization of T is exemplary and in a more general case the equation can be solved to satisfy any desired temperature vector to obtain a corresponding distribution of boundary values, such as power sources, within constraints. Again, further details regarding exemplary solution of the indicated equation will be presented below. As shown at step 209, a thermal system, such as an integrated circuit or a data center, can be provided and/or configured with devices and/or components distributed in accordance with the results of the determining step. Further calculations can be performed for additional parameters, or the process can be stopped, as indicated by the continue block 210. It will thus be appreciated that the flow chart 200 depicts an exemplary method wherein power sources are distributed under steady state conditions to satisfy desired constraints.

In techniques using the principles of the present invention, the representing step 204 can be performed using predictive thermal modeling with a thermal model of the system. For example, the aforementioned thermal resistance matrix A can be generated by calculating temperature fields associated with each of the given power sources individually. Such temperature fields could be calculated, for example, using finite element techniques as implemented in the ANSYS computer software available from ANSYS, Inc. of Canonsburg, Pa., or could be determined using finite difference techniques, such as, are implemented, for example, in the SINDA computer program available from Network Analysis, Inc. of Chandler, Ariz. Note also that the thermal matrix can be measured by individually measuring the temperature fields associated with each individual power source. Regardless of how A is determined, one advantage of certain techniques of the present invention is that the steps depicted in the flow charts and discussed herein can be performed in a substantially open-loop fashion, that is, sensors providing feedback on power or temperature distribution are not needed.

As noted, the constraining parameters can be, for example, spatial locations at which one of the boundary values (for example, one of the power sources) is constrained to be located. In transient systems, the constraining parameter can be a given temporal slot during which a given one of the boundary values is constrained to be applied. For example, design specifications might dictate that a certain power dissipation will occur at a certain time during operation of the system. Still further, the constraining parameter or parameters could include a specification (such as a magnitude, understood to include a range of magnitudes) pertinent to a given one of the boundary values. For example, a certain location on the chip, or in the data center or other system may not be allowed to rise above a certain power level.

As noted, at least some of the boundary values can be power sources. In the case where the system is an integrated circuit chip, the power sources could be representative of electrical devices to be located on the chip. "Devices" in this context should be broadly understood to include both individual devices such as transistors, resistors, capacitors, and the like as well as larger macros or cores, which comprise many such individual devices. As discussed with respect to step 209, one or more exemplary embodiments of the invention contemplate the provision of an integrated circuit designed using techniques of the present invention, wherein such electrical devices are distributed substantially in accordance with the results of the determining step mentioned above. As noted, another example of a system 100 is a data center; in such case, the power sources could be representative of data processing components distributed within the data center, or of the workloads deployed on such components. One or more exemplary embodiments of the invention contemplate the configuration of a data center with the components distributed substantially in accordance with the results of the determining step mentioned above.

Possible goals of distributing power sources using techniques of the present invention include obtaining a substantially uniform steady-state temperature distribution for the system, or maintaining the inlet air temperature of racks in a data center within specification. In the case of a uniform temperature distribution, the power sources can be located such that the partial derivative of resulting temperature distribution with respect to any spatial coordinate is approximately zero under steady state conditions (that is, where the partial derivative of temperature with respect to time is essentially zero). As will be discussed in greater detail below, designing with such a goal in mind may be superior to simply designing for a uniform power distribution.

When it is desired to enhance power distribution, and the aforementioned representing step includes generation of the aforementioned thermal resistance matrix A, the determining step can be performed as follows. Equation (1) below can be solved under constraints associated with the at least one constraining parameter. As noted, A is the aforementioned thermal resistance matrix describing the temperature fields for individual power sources, P is a vector describing the distribution of the power sources, and T is a vector describing the (desired) temperature distribution of the system.

$$AP=T \qquad (1)$$

After a first calculation (that is, a first step through the flow chart of FIG. 2) has been performed, one or more constraining parameters can be redefined, and the determining step 208 can be repeated based on the redefined constraining parameters. As noted, and as will be discussed further below, one decision to be made when utilizing techniques of the present invention is the determination of an appropriate discretization granularity for the thermal model. Accordingly, the representing step 204 can include making such a determination and then creating the thermal model according to the determined discretization granularity.

Figure 3:
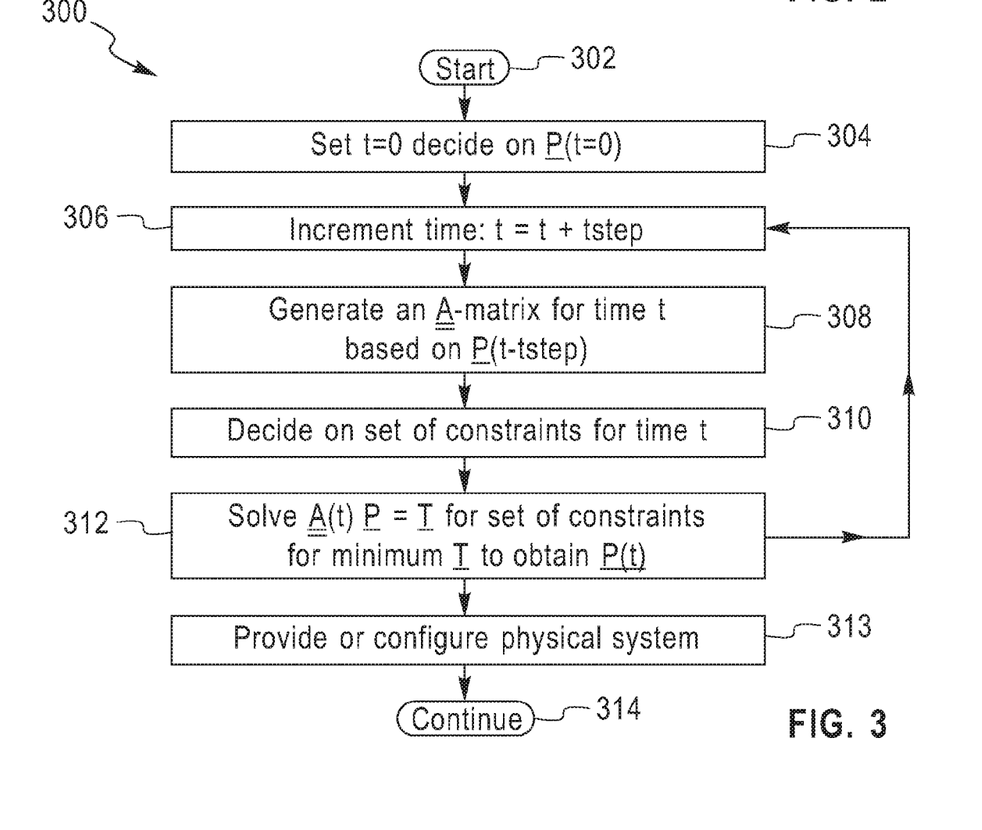
FIG. 3 is a flow chart depicting exemplary method steps for enhancing thermal design of a system, according to another aspect of the present invention, wherein enhancement takes into account spatial and temporal power distribution.

Thus far, the examples of techniques of the present invention have been confined to determining power distribution under steady-state conditions to enhance thermal design of the system. However, techniques of the present invention can also be used to distribute boundary conditions, such as power sources, in time, rather than in space, or in both space and time. Accordingly, attention should now be given to FIG. 3, which shows a flow chart 300 of exemplary method steps for distributing power in both space and time. Thus, techniques of the present invention can be used to determine a spatial distribution, a temporal distribution, or a combined spatial and temporal distribution of boundary conditions such as power sources to enhance thermal design of a given system. After beginning at block 302, and initial power distribution $P_{t=0}$ is decided upon for time t=0, as at step 304. The time can be incremented by an appropriate time step, as illustrated in block 306. Such time step, which may be designated as $t_{step}$, should be substantially less than a characteristic thermal time constant of the system. Such incrementing results in an incremented time value. As indicated at step 308, an A matrix can be generated for the incremented time based on the power distribution P at the previous time. A set of constraints can be determined at block 310, and the following equation:

$$A(t)P=T \qquad (2)$$

can be solved for a given set of constraints, for a desired (e.g., minimum or optimum) T, to obtain P(t).

As indicated by the looping arrow from block 312 to block 306, after the calculations of block 312, the time can be incremented to a new time value, and step 308 can then be performed for the new time value based on the power distribution computed at the previous time step. Note that new constraints can be provided at block 310 during this looping process; were constraints not changed, a steady-state response would be approached. As shown at step 313, a thermal system, such as an integrated circuit or a data center, can be provided and/or configured with devices and/or components distributed in accordance with the calculations of block 312. As indicated at block 314, one can continue to perform additional calculations, or one could stop. Thus, it will be appreciated that when repeating the step of representing the thermal response for a given incremented time value t, the representing can be performed based on a power distribution $P_{t-tstep}$ from a previous time value $t-t_{step}$. Further, when the step of determining the distribution is repeated, the determined distribution will then be $P_t$, the power distribution at time t.

Figure 4:
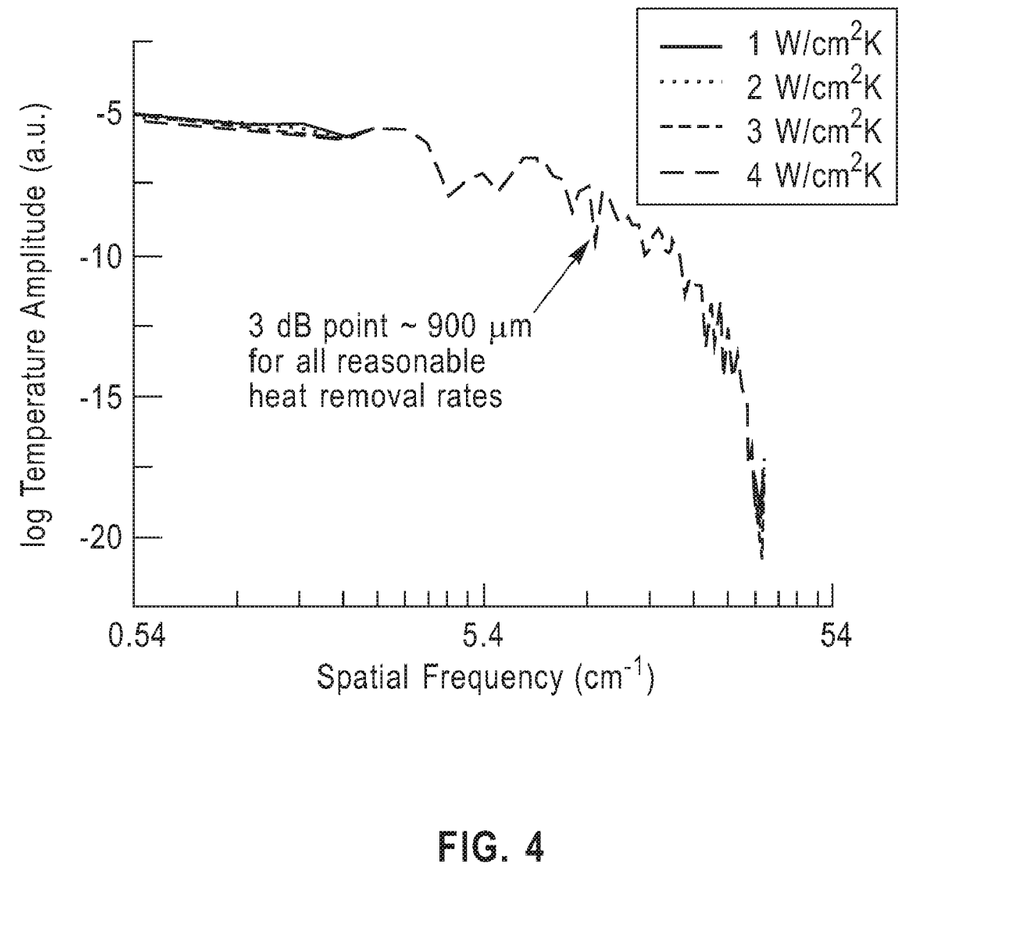
FIG. 4 is a graph of log temperature amplitude vs. spatial frequency illustrating principles of discretization according to an aspect of the present invention.

As noted, one aspect of techniques according to the present invention is determination of an appropriate discretization granularity. Normally, one might expect that reduced granularity would result in increased accuracy. However, it appears that there is a spatial cut-off frequency, below which power distribution management is irrelevant. By way of illustration, a white noise power distribution was applied to a model of a typical microprocessor having dimensions of 1.87 cm×1.87 cm. For a total power of 200 W, and the heat sunk on the back side of a 750 μm thick silicon die, a resulting temperature distribution was calculated for heat removal rates of 1, 2, 3 and 4 W/cm² K. The data was then Fourier transformed. The indicated heat removal rates are typical for state of the art cooling packages. It was determined that heat load variation below a granularity of 900 μm (the 3 dB point) for all four hear removal rates was insignificant. Thus, heat load variations below this limit do not appear to affect the peak temperature in a significant way. The aforementioned calculations are illustrated in FIG. 4, wherein the three dB point is labeled.

Further calculations were performed to confirm the indications of the spatial cut-off frequency just described. The same microprocessor was modeled with a heat removal rate of 2 W/cm² K. A high power density region $1.17^2$ mm², with 5.4 W uniformly distributed therein (for a power density of 395 W/cm²) was included. A temperature rise of approximately 25.2 K was determined. Additional calculations were performed wherein the power distribution within the $1.17^2$ mm² area was changed. For example, in another calculation, the power was distributed in 32 high power density areas (each having an area of $0.146^2$ mm² and a power density of 793 W/cm²) alternating with regions of no power in a checkerboard pattern. Thus, the total power in the region is again 5.4 W. Although the local power density in the region is twice what it was in the previous example, the temperature is determined to be substantially the same as in the uniform case. This again tends to confirm that heat load variations at a granularity of 0.146 μm do not affect the peak temperature. In still a further calculation, the aforementioned $1.17^2$ mm² area was broken down into eight high power density areas ($0.292^2$ mm² with a power density of 793 W/cm²) again alternating with regions with no power in a checkerboard pattern. The total power is once again 5.4 W. The calculated peak temperature was within 1.7% of the temperature calculated for the uniform heat load case. In yet a further example, the $1.17^2$ mm² region was broken down into two high power density areas each with a $0.584^2$ mm² area and a power density of 793 W/cm², again alternating with two regions of no power in a checkerboard pattern. Here, with a granularity of $0.584^2$ mm² area, the peak temperature is still within 11.1% of the temperature calculated for the uniform heat load. Thus, the foregoing discussions would appear to indicate that the spatial cut-off of frequency for 750 μm thick silicon is approximately governed by the thickness of the silicon die for current heat removal rates and those envisioned into the future.

It will appreciated that one difference between a power-limited design, according to prior-art techniques, and a temperature-limited design using techniques according to the present invention is the granularity with which the problem is described. In a power-limited design, one might say that "power is power" and a granularity of one is used (that is, no account is taken of the spatial or temporal distribution of the power). In a temperature-limited design, one might say that "power is not necessarily equal to power" and a granularity of larger than one is used; that is, the problem is discretized in space and/or time so that awareness can be had of the spatial and/or temporal power distribution.

Figure 5:
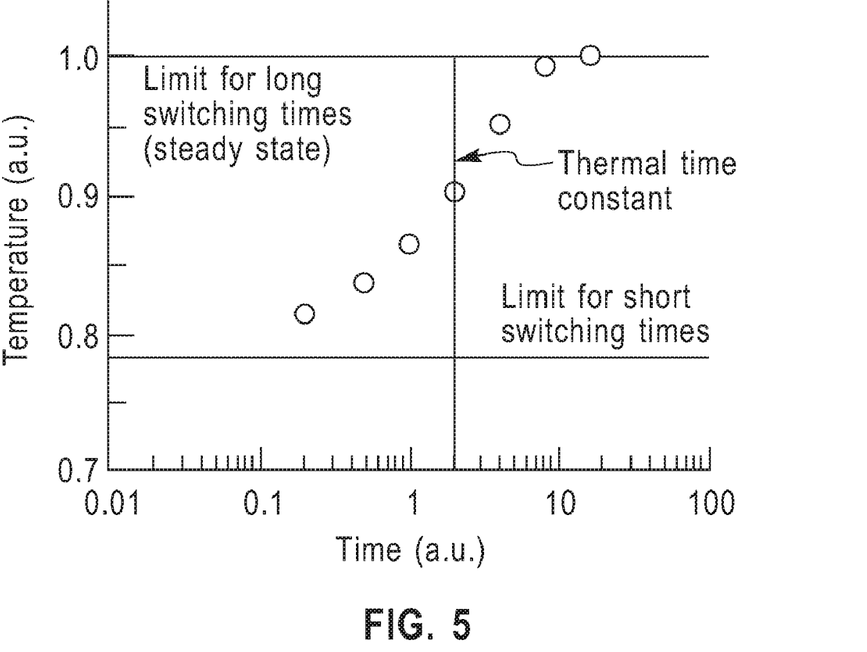
FIG. 5 is a plot of relative peak temperature versus relative switching time (on a log scale) illustrative of constraints in temporal enhancement according to principles of the present invention.

With reference now to FIG. 5, it is instructive to consider application of the exemplary method of FIG. 3 to a dual core microprocessor. In such a processor, the workload, and thus the power, can be switched from one core to another at appropriate times. For illustrative purposes, it may be assumed that the active core that is actually performing the work load is consuming twice as much power as the idle core. Switching the work load, and thus the power, from one core to another will cost some performance. Thus, it may be desirable to switch as rarely as possible; this is a constraint. Without any constraints, the techniques described with regard to FIG. 3 might simply switch the work load from one core to another at every time step. Spatial constraints may result from circuit and/or layout requirements, as well as from the particular cooling solution that is employed. The following discussion addresses appropriate time constraints. In FIG. 5, the peak temperature in relative units is plotted as a function of switching time in relative units. At long switching times, it can be seen that the cores reach the steady state temperatures, and thus the microprocessor will see large temperature changes and reach high temperatures. However, at shorter switching times, the cores no longer reach the steady state temperatures because there is a "thermal" sharing of the power among the cores, and the actual peak temperature drops accordingly. As can be seen in FIG. 5, it is believed preferable to switch the work loads faster than the thermal time constants for each core (in this case, the thermal time constants are identical for each core). If the thermal time constant for one core was slower than for the other, the work load could be switched in an asymmetrical fashion to obtain desired results.

As noted, one possible type of design enhancement that can be performed with techniques of the present invention is an optimization. Optimization schemes can be performed either open or closed loop. The present invention can operate using open loop optimization. Thus, predictive thermal modeling can be employed to optimize power distribution in both space and time. Accordingly, the present invention does not require the use of sensors to provide feedback on power or temperature distributions. If desired, of course, the aforementioned A matrix could be generated using experimental rather than thermal modeling techniques; for example, infrared imaging could be employed.

Further details will now be provided regarding the aforementioned thermal resistance matrix A. As noted, the matrix can be calculated (or can be measured, if desired), and includes the temperature fields for individual power sources. The elements of the matrix are rows of the form:

$a_{00,00}\ a_{00,01}\ a_{00,02}\ \cdots\ a_{00,07}$ $a_{01,00}\ a_{01,01}\ a_{01,02}\ \cdots\ a_{01,07}$

.

.

.

$a_{07,00}\ a_{07,01}\ a_{07,02}\ \cdots\ a_{07,07}$

Each element of the matrix represents a coefficient which is a thermal resistance (in units of K/W); that is, $a_{00,01}$ is the temperature increase in cell 00 for one unit of power applied to cell 01; $a_{04,07}$ means the temperature increase in cell 4 if we apply one unit of power to cell 7. Reference can be had back to FIG. 1 regarding labeling of the cells. As noted, a solution is sought to equation (1). One possible manner of solution employs a linear least squares fit routine, which solves linear least-squares problems with linear constraints. Details of such fitting procedures are per se known, and can be found in Richard J. Hanson, "Linear Least Squares with Bounds and Constraints," *SIAM J of Sci. and Stat. Comp.*, Vol. 7, No. 3 (July 1986), p. 826-834. It will be appreciated that other types of solutions are possible, for example, employing Monte Carlo techniques. When using the linear least squares method, one obtains systems of least-squares equations of the following form:

$$AP \approx T \quad (3)$$

subject to:

$$b_l \leq CP \leq b_u$$

$$P_l \leq P \leq P_u$$

where A is the coefficient matrix of the least-squares equations, T is the right-hand side, and C is the coefficient matrix of the constraints. The vectors $b_l$, $b_u$, $x_l$ and $x_u$ are the lower and upper bounds on the constraints and the variables, respectively. The system is solved by defining dependent variables y=CP and then solving the least-squares system with the lower and upper bounds on x and y. The equation CP−y=0 is a set of equality constraints. These constraints are realized by heavy weighting, i.e., a penalty method.

A simplified example of a matrix solution for a transient case will now be presented for illustrative purposes, and should not be considered as limiting. Consider the case of a rectangular slab of silicon whose thickness is much less that the length and width, which are comparable. Two of the surfaces then have much larger area than the remaining four, and these will be designated the front and back sides. The silicon slab has a number of power sources distributed across the front side, while the back side has a convective boundary condition with a variable heat removal rate. We wish to create a system of equations which permits us to compute the temperatures on the front and back sides of the silicon, given time varying power sources distributed on the front side.

Figure 6:
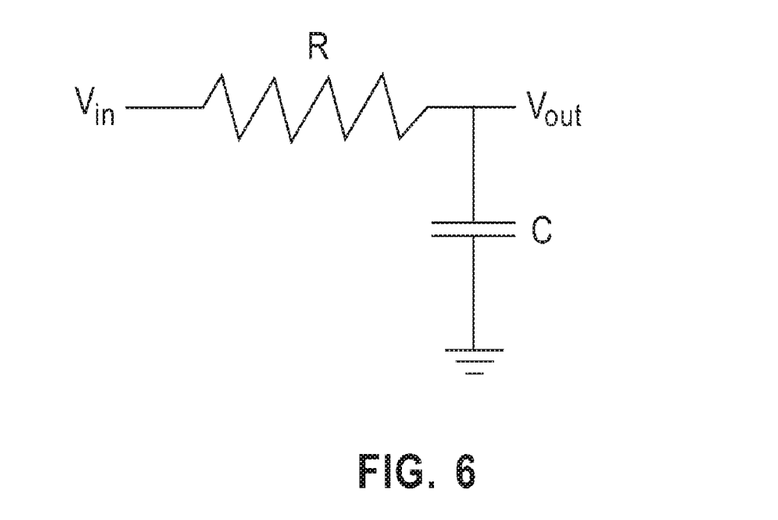
FIG. 6 is a schematic of an electrical analog to an exemplary thermal system to be enhanced according to techniques of the present invention.

In order to develop an intuitive understanding of the time varying three-dimensional system, we begin with an electrical analogy, as shown in FIG. 6. The state equations for this network are:

$$H(s) = \frac{1}{s+a} \quad (4)$$

where s=jω or the complex frequency, and ω=2πR C and in the time domain $$h(t) = e^{-t/RC} \quad (5)$$

To compute the response to an arbitrary signal Vin(t), we have the relation $$V\text{out}(t) = V\text{in}(t) * h(t) \quad (6)$$

where * designates the convolution operator.

For example, if Vin(t) is a step function starting at 0 and rising to 1 V, then Vout(t) is the well known first order response $$V\text{out}(t) = 1 - e^{-t/RC} \quad (7)$$

The continuous function h(t) can be replaced by the discrete time system, sampled at intervals n={0, 1, 2, 3, ...}. If the time intervals (time samples) are equal with a magnitude of $T_s$, the sample intervals become t={0, $T_s$, 2 $T_s$, 3 $T_s$ ...}. These time intervals should be smaller than the pertinent thermal time constants (thermal resistance R multiplied by thermal capacitance C) as discussed in greater detail below. The equivalent response in the discrete time system is $$V\text{out}(n) = \frac{T_s}{RC} V\text{in}(n) + e^{-Ts/RC} V\text{out}(n-1) \quad (8)$$

which converges to the continuous time response as $T_s \to 0$. The product RC is often denoted by the Greek letter $\tau$.

The nature of Equation (8) demonstrates the time-dependent aspect of the system, in which the present output voltage is a function not only of the present input voltage, but also of the history of the system.

The complete time evolution of the response Vout(n) to a given discrete-time input Vin(n) can be computed by applying Equation (8) for n={0, 1, 2, ...} while keeping track of the single state variable Vout(n−1). The initial value of Vout, or Vout(0), must also be stated, and is often given a value of zero.

In general terms, the discrete time first order response is defined by $$g(n) = k1 f(n) + k2 g(n-1) \quad (9)$$

where f(n) is the present input to the system, g(n) is the present output of the system, and g(n−1) is the output of the system one time period ago. Also note that as $T_s \to 0$ (or equivalently as $T_s/\tau \to 0$), k1+k2→1, as required to preserve unity DC gain. If a DC gain other than unity is desired, as may be the case in the physical system we are considering, k1 and k2 should be scaled accordingly.

It is useful to know how the sample interval $T_s$ is chosen in order to minimize error and computation time. One consideration is the Nyquest criteria, such that $1/T_s \leq$ twice the highest temporal frequency content of the continuous input signal. In the case of the semiconductor chip, the temporal frequencies of the power vector will be far higher that the response of the thermal system, which will act as a low pass filter. The likely optimum is thus to average fast frequency components over the period $T_s$, while setting $T_s$ to some reasonable number O(τ/5) where τ is the fastest thermal time constant in the system.

Note that non-infinitesimal $T_s$ leads to an error in the DC gain. Table 1 shows the DC error as a function of $T_s/\tau$ for the case where RC=1.67 milliseconds. For a reasonable $T_s$ such as 0.3 ms, the DC error is around 1.5%. The DC error can be made zero by setting k1=1−k2.

| $T_s$T | τ RC | 1/RC | k1 T/RC | RC/T | k2 exp (−T/RC) | k1 + k2 DC Gain |
|---|---|---|---|---|---|---|
| 0.5000 | 1.67 | 0.598802395 | 0.299401198 | 3.34 | 0.741261957 | 1.040663 |
| 0.4000 | 1.67 | 0.598802395 | 0.239520958 | 4.18 | 0.787004779 | 1.026526 |
| 0.3000 | 1.67 | 0.598802395 | 0.179640719 | 5.57 | 0.835570362 | 1.015211 |
| 0.2000 | 1.67 | 0.598802395 | 0.119760479 | 8.35 | 0.887132898 | 1.006893 |
| 0.1000 | 1.67 | 0.598802395 | 0.05988024 | 16.70 | 0.941877327 | 1.001758 |
| 0.0900 | 1.67 | 0.598802395 | 0.053892216 | 18.56 | 0.94753423 | 1.001426 |
| 0.0800 | 1.67 | 0.598802395 | 0.047904192 | 20.88 | 0.95322511 | 1.001129 |
| 0.0700 | 1.67 | 0.598802395 | 0.041916168 | 23.86 | 0.958950168 | 1.000866 |
| 0.0600 | 1.67 | 0.598802395 | 0.035928144 | 27.83 | 0.964709611 | 1.000638 |
| 0.0500 | 1.67 | 0.598802395 | 0.02994012 | 33.40 | 0.970503646 | 1.000444 |
| 0.0400 | 1.67 | 0.598802395 | 0.023952096 | 41.75 | 0.976332479 | 1.000285 |
| 0.0300 | 1.67 | 0.598802395 | 0.017964072 | 55.67 | 0.98219632 | 1.00016 |

For the second order case we have $$g(n) = k1 f(n) + k2 g(n-1) + k3 g(n-2) \quad (10)$$

where g(n−2) is the output of the system two time periods ago.

In the static case we have the relation $$T = AP \quad (11)$$

where:

P is a power vector containing the magnitudes of each individual power source,

T is a temperature vector containing the magnitudes of each temperature, and

A is a matrix which defines the geometric and physical makeup of the system.

Recall that Equation (11) represents a system with n discrete temperature measurements and n power sources. (The number of power sources does not have to equal the number of temperatures; in this case, for simplicity, we make their numbers identically=M.) Matrix A hence has dimension $M^2 \times M^2$, where M is the dimension of the vectors P and T.

In the first order time varying case, we extend the relation to $$T(n) = A1 P(n) + A2 T(n-1) \quad (12)$$

where:

P(n) is a power vector of length M containing the magnitudes of each individual power source at time t=n $T_s$ T(n), T(n−1) are temperature vectors of length M containing the magnitudes of each temperature at time t=n $T_s$ and t=(n−1) $T_s$ respectively, and A1 and A2 are $M^2 \times M^2$ matrices which defines the geometric and physical makeup of the system.

The second order time varying case, in turn, is defined by the relation $$T(n) = A1 P(n) + A2 T(n-1) + A3 T(n-2) \quad (13)$$

In this case, the present temperature depends on the two most recent past states. Higher order systems may be defined in like fashion.

The nature of Equations (12) and (13) correspond to one's intuition that the time-dependent system must allow the present temperature to be a function not only of the current power levels, but of the temperature history of the system as well. Note that for the static case, Equation (12) reduces to Equation (11), i.e. A1=A and A2=0. Also note the similarity between Equations (9) and (12), and Equations (10) and (13).

Returning to the first order systems described in Equations (9) and (11), we make a few observations. A1 and A2 are clearly similar to k1 and k2, except for their dimensionality. Recalling that A1 and A2 are matrices with dimension $M^2 \times M^2$, where M is the number of power sources, it is apparent that Equation (11) contains $M^2 \times M^2$ linear equations, each of which is an analogy to Equation (9).

We study one such linear equation, and build upon this intuition to determine the values of the $M^2 \times M^2$ elements of matrices A1 and A2. We will simplify our understanding of the problem by considering the case of a single power source at a point (x1,y1,z1) near the center of the front side. This power source is energized to a magnitude of unity for a fixed time, $T_{on}$. As a result, the temperature rise at some point (x2, y2, z2) will increase as a function of time up to some peak value and then decay back to zero.

From physical considerations, we suppose that there will be two time constants which govern the temporal response: one time constant is primarily determined by the geometry, heat capacity and conductivity of the silicon, which holds the circuitry, and the other time constant is primarily determined by the geometry and the nature of the package (e.g., heat removal rate). Bear in mind that these two time constants will be functions of space—points further from the power source will generally have longer time constants. The gain or final temperature value should be established for all points, and will strongly decay with distance from the power source.

However let us suspend our concern over two time constants temporarily, and focus on the mathematics required for the case of a single time constant. For simplicity let us return to the simple geometry suggested by Equation (10), namely that the front and back sides of the chip have $M^2$ nodes numbered from 0 to $M^2-1$ and represented by m={0, 1, 2, ... $M^2$}. In this nomenclature, our power source is denoted simply by $P_m$. As we are often most interested in the front and back surfaces, we denote our temperature monitoring points as $T_{mF}$ and $T_{mB}$ respectively. $T_m$ will sometimes be used to express the temperature at an arbitrary point which may be on the front or back surface.

We assume the existence of a single time constant, $\tau$. We further assume that we have a single power source $P_{m1}$ and are concerned with the response at a single point $T_{m2}$. If we have a means of measuring or simulating the value of the time constant $\tau$ at point m2, then the solution to the problem at point m2 is:

$$T_{m2}(n) = \frac{kT_s}{\tau_{m1 \to m2}} P_{m1}(n) + k e^{-T/\tau_{m1 \to m2}} T_{m2}(n-1) \tag{14}$$

Note that $\tau$ has been replaced by $\tau_{m1 \to m2}$ in order to make it explicit that the time constant we are referring to is the time constant resulting from power source $P_{m1}$ acting upon monitor point $T_{m2}$. Also note that the constant k has been placed in Equation (14) to highlight the fact that the DC gain of the system will in general not be unity. Again, the value of the constant k must be determined by observation or by a model. By extension, all of the coefficients of the A1 and A2 matrices in Equation (11), for either the front or back sides, can be calculated in similar fashion by computing the time constants associated with each point $P_m$, where m={0, 1, 2, ... n2} upon each point $T_m$ where m={0, 1, 2, ... $n^2$}.

Now that we have established the basic mathematical nomenclature and relations, we return to the issue of multiple time constants. We have suggested that there will be two time constants which govern the temporal response: one time constant is determined by the heat capacity and conductivity of the silicon, and one time constant is determined by the heat removal rate. Both time constants are a function of the exact geometry of the system.

Figure 7:
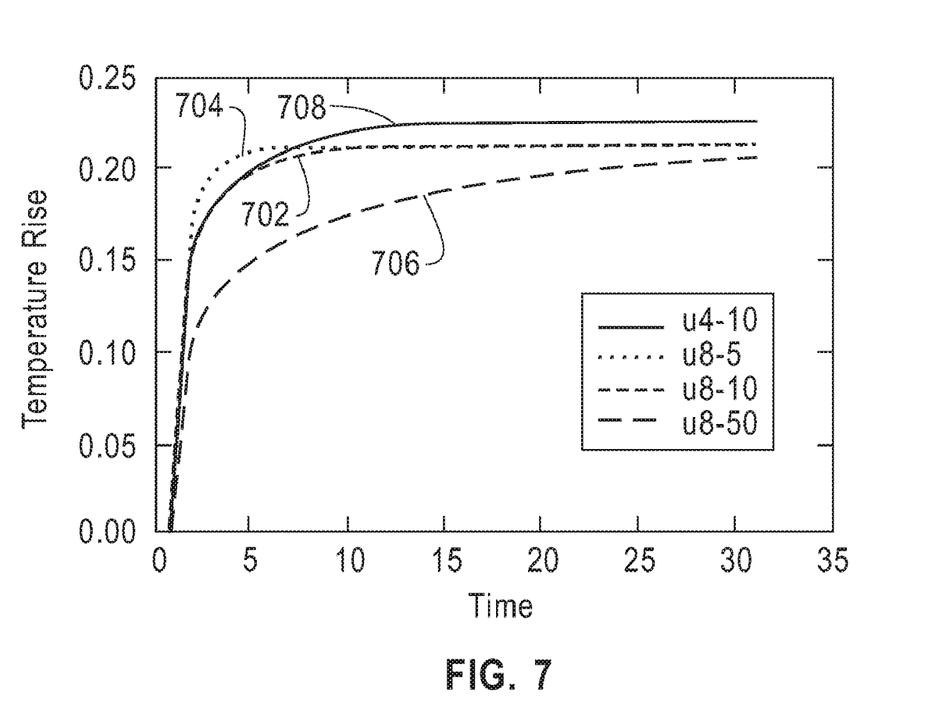
FIG. 7 is a plot of finite element thermal simulations of an illustrative slab of material.

For insight we turn to simulation. The plot in FIG. 7 shows finite element simulations of a slab of material with three different heat capacities. The curves labeled 702, 704, and 706 have heat capacities of 10, 5 and 50 respectively and a convective boundary condition (heat removal rate) of 8; one case (the curve 708) is repeated with a heat removal rate of 4 and a heat capacity of 10. It is apparent that with thermal conductivity held constant, the initial (rapid time constant) temperature rise will be a function of the heat capacity alone. The slower time constant and final value are a function of the heat removal rate alone. From the above discussion it becomes clear that we are not dealing with a traditional second-order system; rather, we essentially have the sum of two independent first order systems. Thus the model for the combined system will involve the sum of two first order models:

$$T_1(n) = A1 P(n) + A2 T_1(n-1) \tag{15}$$

$$T_2(n) = A3 P(n) + A4 T_2(n-1) \tag{16}$$

$$T(n) = T_1(n) + T_2(n) \tag{17}$$

where the coefficients of A1-A4 are determined as in Equation (14) but where two separate time constants must be used, the first to compute A1 and A2 and the second to compute A3 and A4.

Figure 8:
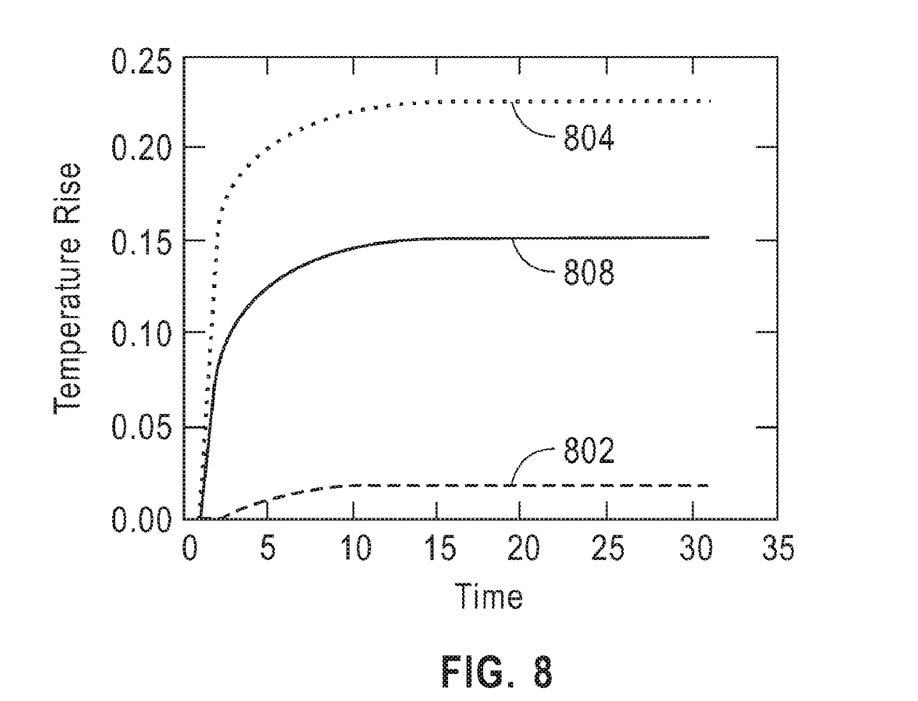
FIG. 8 is a plot of results for three disparate points in the slab.
Figure 9:
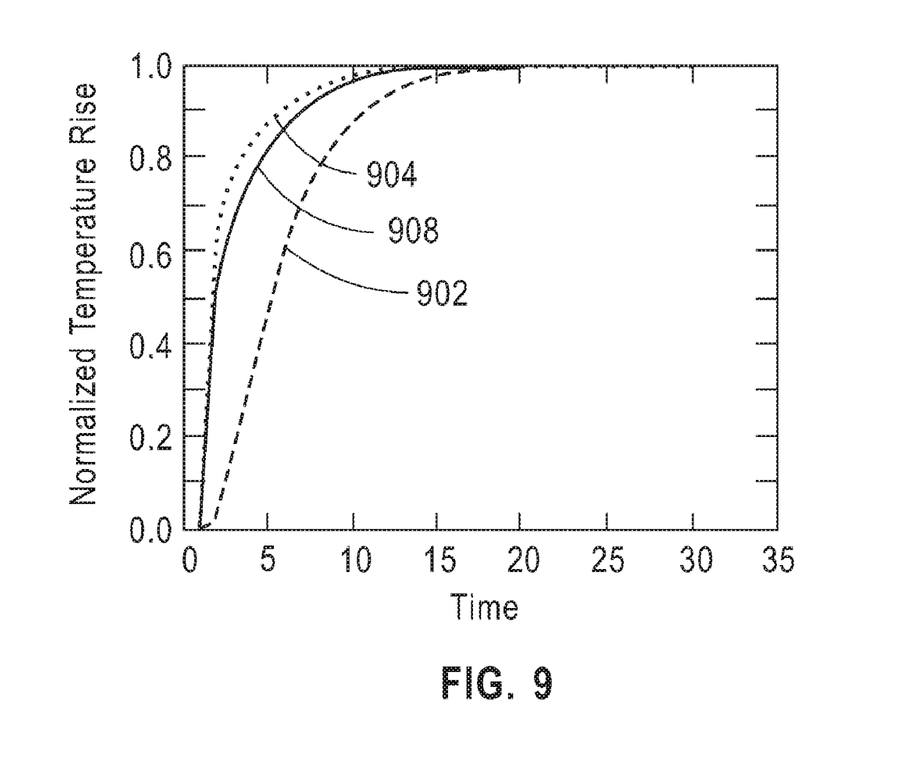
FIG. 9 is a normalized version of FIG. 8.

Note that in order to unambiguously extract all the relevant time constants from a finite element simulation, it may be necessary to modify the heat capacity, heat removal rate, etc. so that the time constants can be clearly distinguished. For example, setting the convective heat coefficient to zero might allow A1 and A2 to be solved. The two plots in FIGS. 8 and 9 show time constants and final values for three disparate points (802, 804 and 808 in FIG. 8 and 902, 904, 908 in FIG. 9, respectively) within the silicon slab; the plot in FIG. 9 is a normalized version of the plot in FIG. 8.

Figure 10:
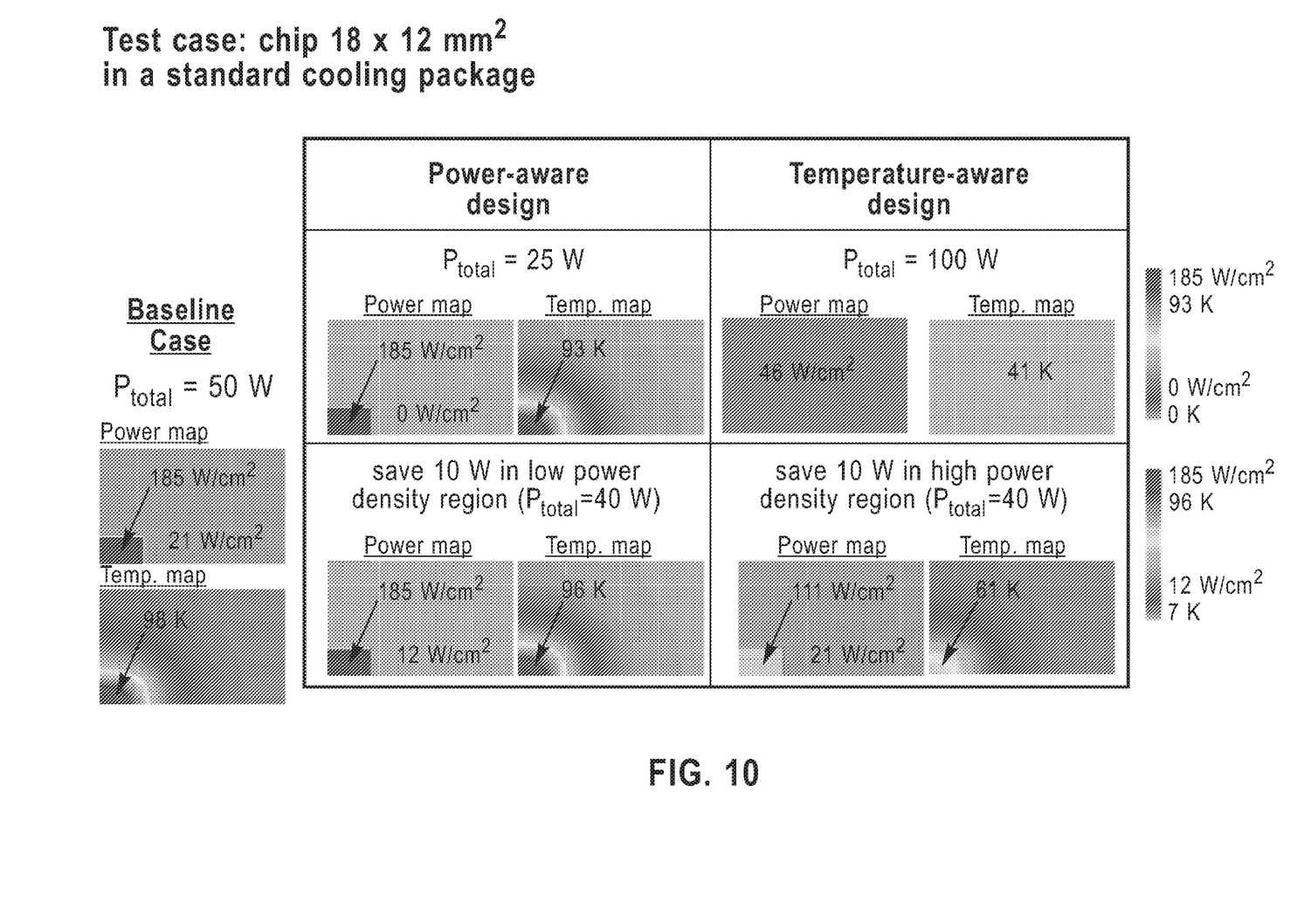
FIG. 10 shows a comparison of an exemplary integrated circuit chip designed in accordance with techniques of the present invention and compared to such a chip designed by conventional techniques.

Several examples will now be presented demonstrating the potential enhancements that can be obtained using techniques according to the present invention. Consider an 18×12 $mm^2$ chip in a generic cooling package having a heat transfer coefficient of 1 $W/cm^2$ K. With reference now to FIG. 10, consider the application of power-aware design techniques according to the prior art. Suppose the overall power dissipation was 25 W. As shown in the "power-aware design" column at the top, if all 25 W were located in a high power density region of 185 $W/cm^2$ at the lower left hand corner, with the remainder of the chip dissipating no power, the temperature rise would be 93 K. At the top of the next column, under "temperature-aware design," a comparison is made to a 100 W chip where the power is uniformly distributed over the entire chip, resulting in a power density of 46 $W/cm^2$. As can be seen, there is only a 41 K rise. If one designs only for power, the 25 W chip would be considered to be superior. However, it can be seen that the 100 W chip with uniform power distribution is actually thermally superior due to the lower maximum temperature rise. Thus, the resulting cooling solution could be significantly simpler and cheaper.

Consider now the bottom row, where in a baseline case, we might have a total power dissipation of 50 W. This might be divided between a high power density region in the lower left hand corner having a power density of 185 W/cm², and the remainder of the chip might have a relatively low power dissipation of 21 W/cm². In such a case, a temperature rise of 98 K might be obtained at the hottest point in the lower left hand corner. We turn now to the lower row of the left hand "power-aware design" column. Here, using prior-art power-aware techniques, 10 W is saved in the low power density region as compared to the baseline case. That is, the lower left hand corner still has a density of 185 W/cm². However, the remainder of the chip only has a power density of 12 W/cm². The resulting maximum temperature rise is 96 K, only a 2 K improvement from the baseline case. Such improvement might be obtained, for example, using clock gating techniques. Now consider the lower right hand corner of FIG. 10, that is, the lower row in the "temperature-aware design" column. Here, the 10 W is saved in the high power density region in the lower left hand corner. That is, the power density in the lower left hand corner is reduced to 111 W/cm², with 21 W/cm² over the remainder of the chip. Here, by saving the power in the highest density region, the maximum temperature rise is reduced substantially, to only 61 K. Thus, while a power-aware design approach would consider both entries equivalent, from a thermal standpoint, the temperature-aware design in the lower right hand corner is far superior. Again, it will be appreciated that a simpler and cheaper cooling solution could be employed for the chip design using techniques according to the present invention, as illustrated at the lower right hand corner of FIG. 10.

As noted, the present invention is applicable to many different types of thermal systems, not merely integrated circuit chips, but also, e.g., computers and data centers. It will be appreciated that the relevant length and time scales of power distribution management change when moving from the individual device all the way up to the data center. While, as discussed above, below a spatial cut-off frequency increased granularity is not helpful in power distribution management, above such cut-off frequency substantial benefits may be obtained. That is, by use of power distribution techniques of the present invention, substantially lower peak system temperatures can be expected. For layers close to the circuit level, power distribution needs to be managed in hardware and at the layout phase, while for larger physical layers (for example, starting at the core level) hardware and software can be used to distribute the power in order to minimize hot spots in the computer system. The techniques discussed herein may be incorporated in the hardware, layout, or even in the software managing the power distribution of the system. In each case, the physics of the problem are fundamentally similar, and the techniques of the present invention can be employed to enhance the power distribution from the circuit level up to the data center level. Characteristic length scales and bounding characteristic time scales are given in the following table:

| System | Length Scale | Time Scale |
|---|---|---|
| Device | 0.1 μm | 1 ps |
| Circuit | 10 μm | |
| Macro | 100 μm | |
| Chip | 1 cm | |

-continued

| System | Length Scale | Time Scale |
|---|---|---|
| Multi-core | 2.5 cm | |
| Multi-chip | 5 cm | |
| Box | 50 cm | |
| Rack | 2 meters | |
| Data Center | 50 meters | 1 hour |

Towards the smaller length scale, as noted, power distribution is not relevant; in the lower middle range, as discussed, design techniques should be included during the hardware and layout phases, and in the upper half of the spectrum, hardware and software solutions can be employed. A suitable thermal optimization tool utilizing techniques of the present invention can be incorporated into other circuit design tools, or as part of an operating system or so-called "hypervisor." The thermal diffusion time is given by the equation:

$$t = l^2/\kappa, \quad (18)$$

where κ is the thermal diffusivity in m²/s, and l is the characteristic dimension in meters.

Figure 11:
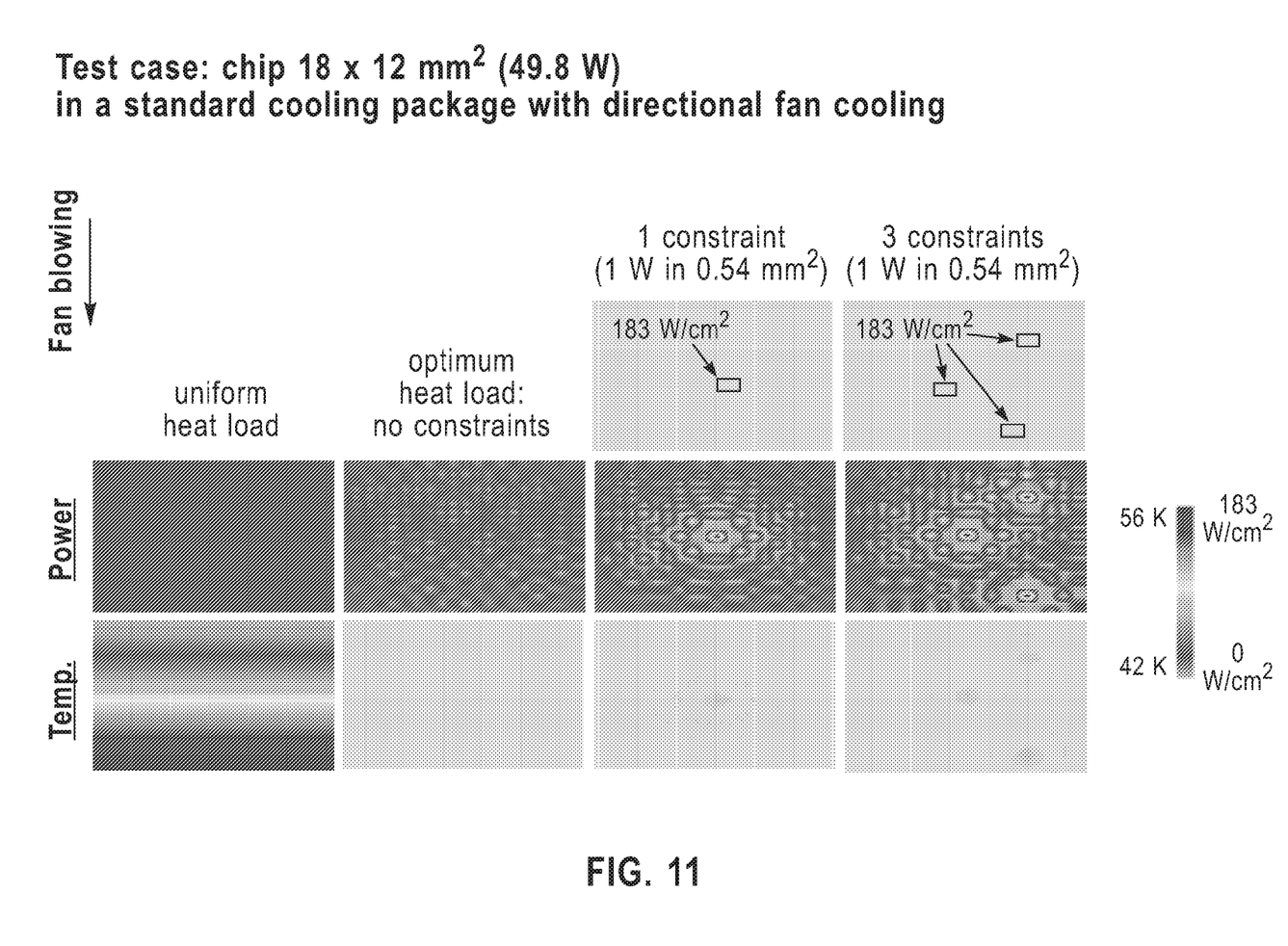
FIG. 11 shows an example of application of certain techniques of the present invention.

By way of further example, with reference now to FIG. 11, a microprocessor chip with an 18×12 mm² die size and a 750 μm die thickness might dissipate a total power of 49.8 W. Consider air cooling with a fan blowing from the "top" to the "bottom" part of the chip. If the heat load is uniform, as shown in the first column of FIG. 11, the bottom of the chip will be hotter because the inlet cooling media has its coldest temperature at the top and the temperature increases as it flows past the heated surface. If techniques of the present invention are employed, with no constraint other then keeping the total power of 49.8 W (as in the second column of FIG. 11), one can obtain a power distribution that results in a uniform chip temperature. If a region of 0.54² mm in the middle of the chip was required to dissipate 1 W of power (as in the third column of FIG. 11), thus yielding a local power density of 183 W/cm², techniques of the present invention could optimize distribution of power over the remainder of the chip to yield a modest peak temperature rise. Even if there were three such high density regions (as in the fourth column of FIG. 11), a favorable temperature distribution, superior to the uniform heat load case, could be obtained using techniques of the present invention.

Figure 12:
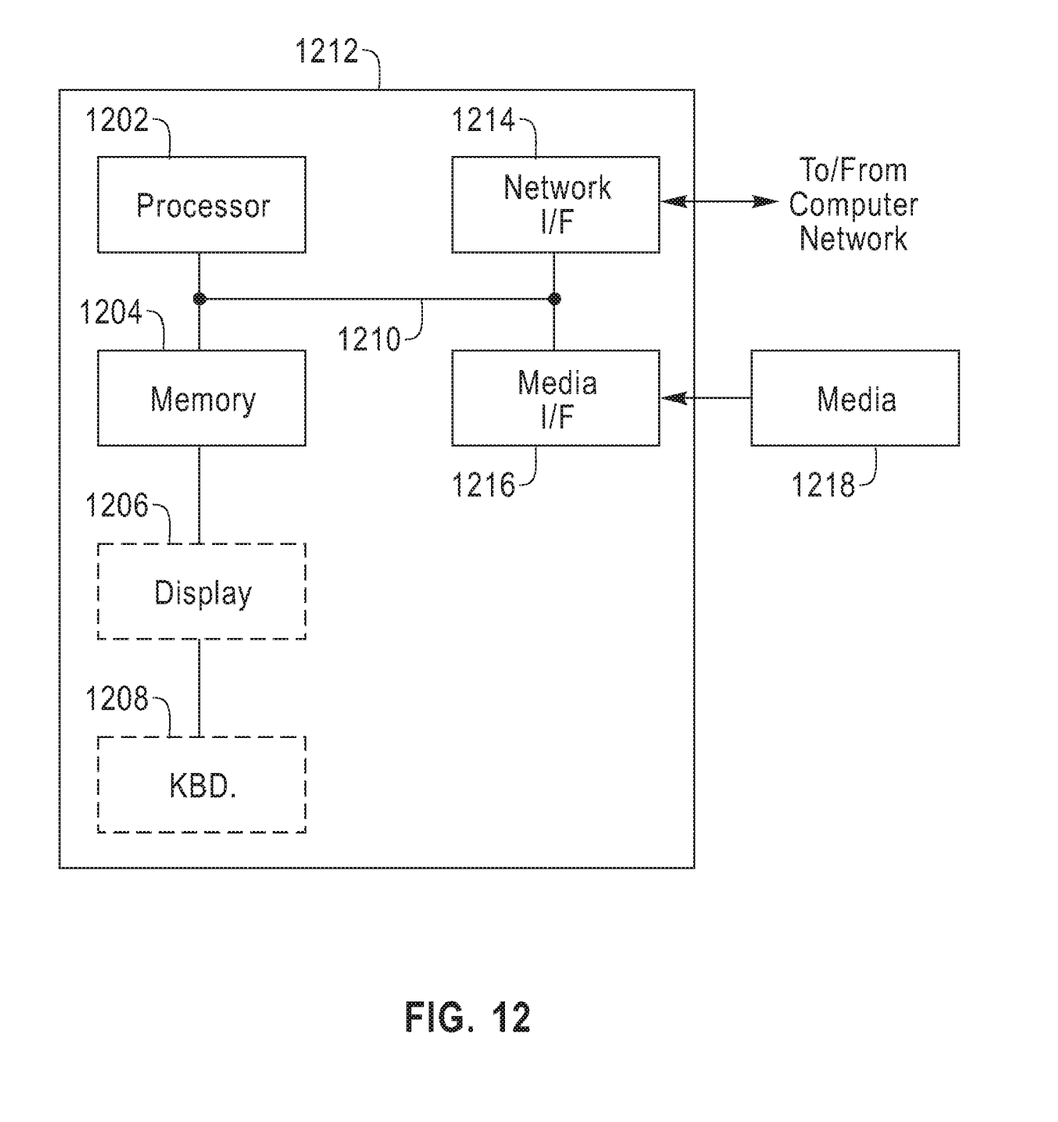
FIG. 12 depicts a computer system that may be useful in implementing one or more aspects and/or elements of the present invention.

A variety of techniques, utilizing dedicated hardware, general purpose processors, firmware, software, or a combination of the foregoing may be employed to implement the present invention. At present, it is believed that the preferred implementation will make substantial use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 1218) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 1204), magnetic tape, a removable computer diskette (e.g. media 1218), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1202 coupled directly or indirectly to memory elements 1204 through a system bus 1210. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for enhancing thermal design of a physical system having a plurality of boundary values, said method comprising the steps of:

determining an initial spatial power distribution $P_{t=0}$ at an initial time t=0;

incrementing said time t by a time step $t_{step}$ less than a characteristic thermal time constant of said physical system to obtain an incremented time value;

representing thermal response of said physical system to said plurality of boundary values at said incremented time value as a superposition of temperature fields associated with given ones of said boundary values, based on a previous spatial power distribution at a time equal to said incremented time value less said time step $t_{step}$, said previous spatial power distribution comprising said initial spatial power distribution for a first increment;

obtaining at least one constraining parameter for said incremented time value;

calculating a subsequent spatial power distribution $P_t$ at said incremented time value, wherein said subsequent spatial power distribution $P_t$ both satisfies said at least one constraining parameter for said incremented time value and provides a minimum temperature distribution;

repeating said incrementing step for a plurality of repetitions to obtain a plurality of subsequent incremented time values;

wherein:

at each of said repetitions, said steps of representing thermal response, obtaining at least one constraining parameter, and calculating a subsequent spatial power distribution are repeated to obtain a transient analysis, said transient analysis comprising a plurality of said subsequent spatial power distributions, calculated at each of said plurality of subsequent incremented time values, in which at least some of said subsequent spatial power distributions are time-varying; and at least one of said boundary values comprises a time-varying power source;

further comprising applying said time-varying power source to said physical system in accordance with said time-varying subsequent spatial power distributions.

2. The method of claim 1, wherein said time step $t_{step}$ less than said characteristic thermal time constant of said physical system is no greater than one fifth of said characteristic thermal time constant of said physical system.

3. The method of claim 2, wherein said representing, obtaining and determining steps are performed in a substantially open-loop manner, substantially without using sensor feedback pertaining to power distribution and substantially without using sensor feedback pertaining to temperature distribution.

4. The method of claim 2, wherein at least another one of said boundary values comprises a fixed temperature region.

5. The method of claim 2, wherein:

said physical system is an integrated circuit chip; and said time-varying power source represents an electrical device to be located on said chip.

6. The method of claim 2, wherein:
said physical system is a data center; and
said time-varying power source represents a data-processing component within said data center.

7. The method of claim 2, wherein said representing step is performed via predictive thermal modeling with a thermal model of said physical system.

8. The method of claim 2, wherein:
at least some additional ones of said boundary values comprise power sources;
said representing step comprises generating $M^2 \times M^2$ matrices, A1 and A2 defining geometric and physical makeup of said physical system; and
said calculating step comprises calculating said subsequent spatial power distribution by solving:

$$T(n)=A1P(n)+A2T(n-1)$$

where:
P(n) is a power vector of length M containing magnitudes of each individual one of said power sources at time t=n $T_s$; and
T(n), T(n−1) are temperature vectors of length M containing magnitudes of each temperature at time t=n $T_s$ and t=(n−1) $T_s$.

9. The method of claim 8, wherein said representing step is performed via predictive thermal modeling with a thermal model of said system and further comprises:
determining an appropriate discretization granularity for said thermal model of said physical system; and
creating said thermal model according to said discretization granularity.

10. The method of claim 2, wherein:
at least some additional ones of said boundary values comprise power sources;
said representing step comprises generating $M^2 \times M^2$ matrices A1, A2, and A3, defining geometric and physical makeup of said physical system; and
said calculating step comprises calculating said subsequent spatial power distribution of said power sources by solving:

$$T(n)=A1P(n)+A2T(n-1)+A3T(n-2)$$

where:
P(n) is a power vector of length M containing magnitudes of each individual one of said power sources at time t=n $T_s$; and
T(n), T(n−1), T(n−2) are temperature vectors of length M containing magnitudes of each temperature at time t=n $T_s$, t=(n−1) $T_s$, and t=(n−2) $T_s$.

11. The method of claim 2, wherein:
at least some additional ones of said boundary values comprise power sources;
said representing step comprises generating $M^2 \times M^2$ matrices, A1, A2, A3, and A4, defining geometric and physical makeup of said physical system, A1, A2 being based on a time constant related to initial temperature rise based on heat capacity, A3, A4 being based on a time constant related to heat removal rate alone; and
said calculating step comprises calculating said subsequent spatial power distribution by solving:

$$T_1(n)=A1P(n)+A2T_1(n-1)$$

$$T_2(n)=A3P(n)+A4T_2(n-1)$$

$$T(n)=T_1(n)+T_2(n)$$

where:
P(n) is a power vector of length M containing magnitudes of each individual one of said power sources at time t=n $T_s$; and
$T_i(n)$, $T_i(n-1)$, are temperature vectors of length M containing magnitudes of each temperature at time t=n $T_s$, t=(n−1) $T_s$.

12. A computer program product comprising a tangible computer readable storage medium having computer useable program code for enhancing thermal design of a physical system having a plurality of boundary values, said computer program product including:
computer useable program code for determining an initial spatial power distribution $P_{t=0}$ at an initial time t=0;
computer useable program code for incrementing said time t by a time step $t_{step}$ less than a characteristic thermal time constant of said physical system to obtain an incremented time value;
computer useable program code for representing thermal response of said physical system to said plurality of boundary values at said incremented time value as a superposition of temperature fields associated with given ones of said boundary values, based on a previous spatial power distribution at a time equal to said incremented time value less said time step $t_{step}$, said previous spatial power distribution comprising said initial spatial power distribution for a first increment;
computer useable program code for obtaining at least one constraining parameter for said incremented time value;
computer usable program code for calculating a subsequent spatial power distribution $P_t$ at said incremented time value, wherein said subsequent spatial power distribution $P_t$ both satisfies said at least one constraining parameter for said incremented time value and provides a minimum temperature distribution; and
computer useable program code for repeating said incrementing step for a plurality of repetitions to obtain a plurality of subsequent incremented time values;
wherein:
at each of said repetitions, said steps of representing thermal response, obtaining at least one constraining parameter, and calculating a subsequent spatial power distribution are repeated to obtain a transient analysis, said transient analysis comprising a plurality of said subsequent spatial power distributions, calculated at each of said plurality of subsequent incremented time values, in which at least some of said subsequent spatial power distributions are time-varying; and
at least one of said boundary values comprises a time-varying power source;
further comprising computer usable program code to facilitate applying said time-varying power source to said physical system in accordance with said time-varying subsequent spatial power distributions.

13. The computer program product of claim 12, wherein said computer useable program code for incrementing said time t by said time step $t_{step}$ less than said characteristic thermal time constant of said physical system is configured to set said time step $t_{step}$ to a value no greater than one fifth of said characteristic thermal time constant of said physical system.

14. An apparatus for enhancing thermal design of a physical system having a plurality of boundary values, comprising:
a memory; and
at least one processor coupled to said memory and operative to:

determine an initial spatial power distribution $P_{t=0}$ at an initial time t=0;

increment said time t by a time step $t_{step}$ less than a characteristic thermal time constant of said physical system to obtain an incremented time value;

represent thermal response of said physical system to said plurality of boundary values at said incremented time value as a superposition of temperature fields associated with given ones of said boundary values, based on a previous spatial power distribution at a time equal to said incremented time value less said time step $t_{step}$, said previous spatial power distribution comprising said initial spatial power distribution for a first increment;

obtain at least one constraining parameter for said incremented time value;

calculate a subsequent spatial power distribution $P_t$ at said incremented time value, wherein said subsequent spatial power distribution $P_t$ both satisfies said at least one constraining parameter for said incremented time value and provides a minimum temperature distribution;

repeat said incrementing step for a plurality of repetitions to obtain a plurality of subsequent incremented time values;

wherein:

at each of said repetitions, said steps of representing thermal response, obtaining at least one constraining parameter, and calculating a subsequent spatial power distribution are repeated to obtain a transient analysis, said transient analysis comprising a plurality of said subsequent spatial power distributions, calculated at each of said plurality of subsequent incremented time values, in which at least some of said subsequent spatial power distributions are time-varying; and at least one of said boundary values comprises a time-varying power source;

said at least one processor is further operative to facilitate applying said time-varying power source to said physical system in accordance with said time-varying subsequent spatial power distributions.

15. The apparatus of claim 14, wherein said at least one processor is operative to set said time step $t_{step}$ to a value no greater than one fifth of said characteristic thermal time constant of said physical system.

* * * * *